Oct. 11, 1932.    F. J. JARVIS    1,882,497
BEARING CONSTRUCTION
Filed Jan. 2, 1929
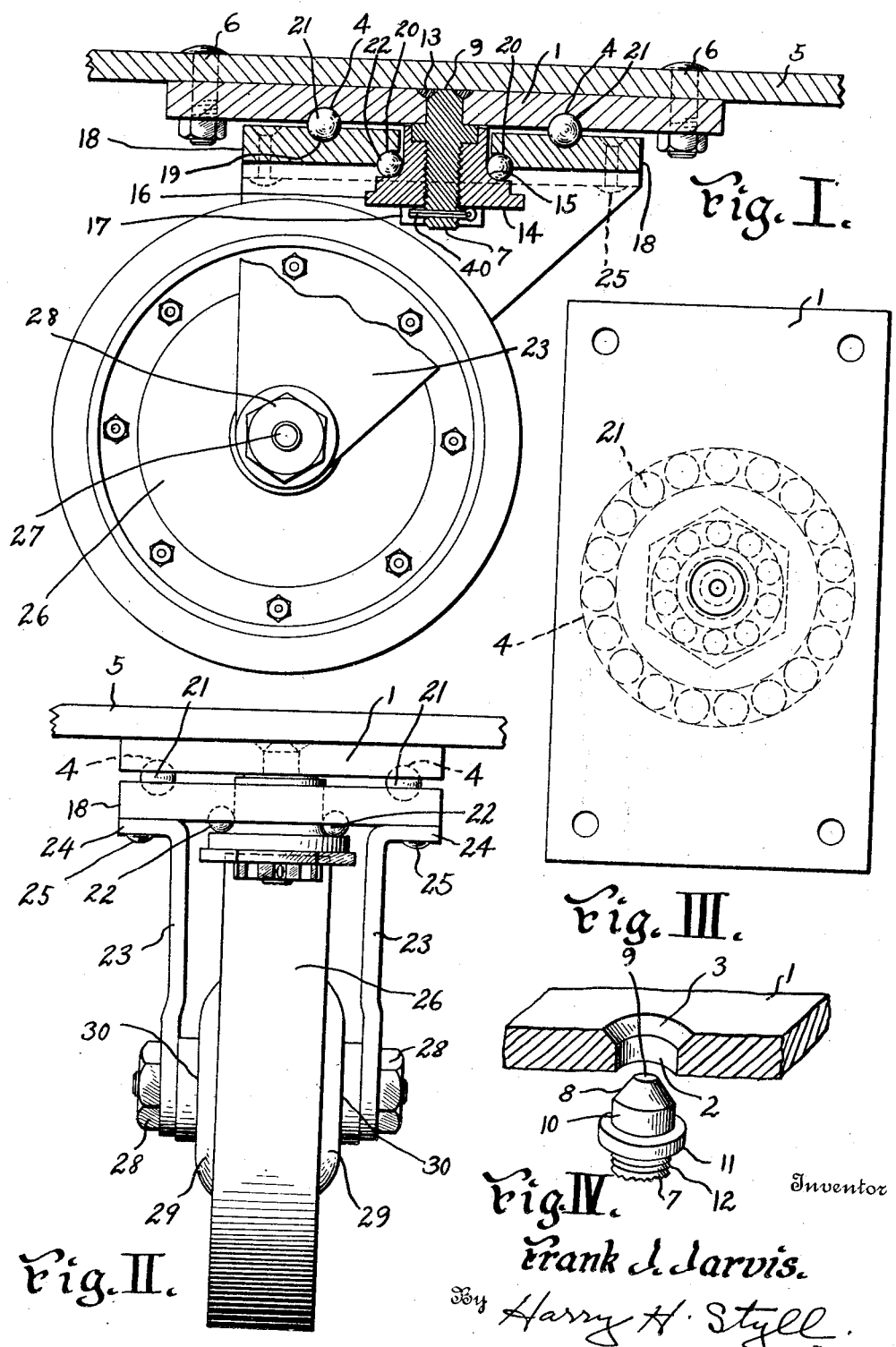
Inventor
Frank J. Jarvis.
By Harry H. Styll
Attorney Patented Oct. 11, 1932

1,882,497

UNITED STATES PATENT OFFICE

FRANK J. JARVIS, OF PALMER, MASSACHUSETTS, ASSIGNOR TO JARVIS & JARVIS, INC., OF PALMER, MASSACHUSETTS, A CORPORATION OF MASSACHUSETTS

BEARING CONSTRUCTION

Application filed January 2, 1929. Serial No. 329,699.

This invention relates to improvements in bearing constructions and has particular reference to an improved bearing construction for a wheel support and the like and to a new process for making the same.

The principal object of the invention is to provide an improved process for making a bearing construction that will positively maintain its alignment, to insure the free and equal running of the bearing under all conditions.

Another object of the invention is to provide an improved bearing construction that will maintain the positive alignment of the working parts.

Another object of the invention is to provide simple, efficient and economical means for producing a positively maintained alignment for a free running bearing.

Another object of the invention is to provide an improved bearing pintle and process for constructing and aligning the same.

Other objects and advantages of the invention will become apparent from the following description taken in connection with the accompanying drawing, and it will be apparent that many changes may be made in the arrangements of parts, details of construction and steps of the process without departing from the spirit of the invention as expressed in the accompanying claim. I, therefore do not wish to be limited to the exact details and arrangements shown and described as the preferred forms only have been shown by way of illustration.

Referring to the drawing:

Fig. I is a front view partially in cross section showing the invention applied to a caster wheel;

Fig. II is an end view of Fig. I;

Fig. III is a top view of the swivel plate of the device; and

Fig. IV is a fragmentary perspective view partially in cross section showing the pintle connection with the parts in disassembled arrangement.

In free running bearings, particularly wheel and caster bearings, prior to my invention the pintle connection was usually a plain rivet connection. This connection like all rivet connections was liable to work loose and allow the pintle to turn, thus throwing out the alignment of the bearing parts. Many of these devices were free running only in their original alignment. If the pintle became loose the alignment was destroyed and the bearing surfaces would bind, thus making the parts either hard to operate or locking them all together. It is, therefore, the prime object of my invention to provide a simple, efficient and inexpensive pintle construction that will prevent this loss of alignment and insure the maintenance of a free and easy running bearing throughout the life of the device.

Referring to the drawing wherein similar reference characters denote corresponding parts throughout, a top or swivel plate 1 is provided with a pintle opening 2 having the countersink 3 at the outer edge of the swivel plate 1. The swivel plate 1 is also provided with a circular ball race 4. The swivel plate 1 is attached to the retaining object 5 by means of the bolts 6. The bearing pintle 7 is conically tapered at 8, the small diameter being at the top 9. Beneath the taper 8 are the shoulder 10, the flange 11 and the shank 12, the shank 12 being threaded.

The pintle 7 is inserted in the opening 2 in the swivel plate 1, the portion 10 fitting in the uncountersunk portion of the opening 2 and the tapered part 8 extending into the countersunk portion 3 and the upper side of the flange 11 engaging the under side of the plate 1. The shoulder 10 and the surfaces of the flange 11 are truly made so that when the pintle is inserted in the opening 2 it is aligned in true bearing position. After the pintle 7 has been inserted in the opening 2 it is welded, preferably electrically welded, into position, the molten metal of the welding filling in the space between the part 8 of the pintle and the countersink 3 of the swivel plate 1, this being indicated by the triangular piece 13 in Fig. I. This welding operation has the effect of uniting the pintle 7 and the swivel 1 as though they were one piece of material giving the effect of an integral construction. After the pintle 7 has been welded into the opening 2 the top portion of the pintle and the welding material 13 are plated off smooth to the surface of the top of the swivel 1 so that the swivel 1 and the pintle 7 are in effect one piece of material. Threaded on the shank 12 of the pintle 7 is a bearing cone 14 having the fillet 15 which acts as a ball race and the extending flange 16 formed into a nut by which the cone 14 may be screwed onto or taken off of the pintle 7. The inner edge of the cone 14 is fitted around the flange 11 of the pintle 7 and the pintle 7 extends beyond the lower edge of the cone 14.

A lock nut 17 and cotter pin 40 are provided to maintain the cone 14 on the pintle 7. A top bracket 18 is provided with a ball race 19 aligned with the ball race 4 in the swivel plate 1 and it is also provided with a ball race 20 aligned with the ball race 15 of the cone 14. Ball bearing members 21 are placed in the ball races 4 and 19 of the swivel plate 1 and the bracket 18 respectively, and ball bearing members 22 are placed in the ball races 20 and 15 of the bracket plate 18 and the cone bearing 14, respectively. Side support plates 23 have the flanges 24 which are secured to the top bracket plate 18 by means of the rivets 25 or other connecting means. These bracket plates 23 act as the bearing support for the wheel 26, the wheel being rotatably supported between the said bracket plates 23. The wheel 26 is rotatably mounted on the wheel spindle 27, being held in place by the nuts 28 or other well known retaining devices. Between the hub 29 of the wheel 26 and the bracket plates are the spacer washers 30.

The assembly and operation of the device are as follows: The pintle 7 is carefully aligned to true position and dimensions to produce the taper 8, body or shoulder 10, flange 11 and shank 12. The hole of the countersink 3 is carefully aligned and shaped in the swivel plate 1. The pintle 7 is then entered into the opening 2 in the swivel plate 1 and the parts welded together as has been described. The top bracket plate is then placed in aligned position with the swivel 1, the balls 21 being inserted in the ball races between these two parts. The cone 14 is next entered on the pintle 7 and the balls 22 inserted in the ball races between the cone 14 and top bracket plate 18. The cone is adjusted to position and locked in place on the pintle 7 by the lock nut 17 and cotter pin 40. The side bracket plates 23 have previously been bolted in place on the top bracket plate 18 and the wheel 26 mounted between the bracket plates as described.

In operation it will be seen that the top bracket plate 18 will freely revolve or rotate with relation to the swivel plate 1 by means of the ball bearing 21 and the ball bearing 22. The top bracket plate 18, the support plates 23 and the wheel 26 all move together allowing free running adjustment of the wheel 26 on its support. It will be particularly noted that once the pintle 7 has been welded to the plate 1 as described it becomes an integral part thereof and the maintenance of its alignment is assured. The pintle 7 cannot move from its related position with the top plate 1, thus insuring that once the bearing is aligned for free and easy running that alignment will be maintained throughout the life of the device.

From the foregoing description it will be seen that I have provided simple, efficient and economical means for carrying out all of the objects of the invention and particularly for maintaining the initial or original alignment of the parts.

Having described my invention, I claim:

In a device of the character described, a support plate having an opening therein, a retaining pin having a collar of larger diameter than the pin and positioned intermediate the ends of the pin, one end of the pin extending into the opening of the support plate and one side of the collar abutting the surface of said support plate adjacent the opening therein, the portion of the pin extending into said opening being welded to said support plate to integrally secure it thereto, a bushing on the portion of the pin exterior of the support plate, said bushing having a recessed portion receiving the said collar on the pin, a wheel support having depending side plates and a connecting section, said section having an opening through which the bushing extends, ball bearings between the bushing and connecting section of the wheel support, ball bearings between said section and the support plate, and a wheel rotatably mounted between the depending plates of the wheel support.

FRANK J. JARVIS.